3,403,137
PROCESSES FOR PREPARING ETHYLENE/VINYL CHLORIDE COPOLYMERS
Harry M. Andersen, Ballwin, and James D. Gabbert and Oliver De S. Deex, St. Louis, Mo., assignors to Monsanto Company, a corporation of Delaware
No Drawing. Filed Nov. 8, 1963, Ser. No. 322,492
18 Claims. (Cl. 260—87.5)

This invention is directed towards methods for preparing ethylene/vinyl chloride copolymers be redox polymerization in aqueous emulsion.

Ethylene/vinyl chloride copolymers are particularly useful in coating compositions and for unsupported films and can be fabricated into piping, wire insulation, and the like.

Ethylene/vinyl chloride compositions with vinyl chloride content varying from 1 to 99 percent by weight are disclosed in U.S. 2,422,392 which claims processes for preparing same. Reaction is carried out in aqueous suspension and requires an organic peroxide catalyst, an oxidizable sulfoxy compound, and an alkaline buffer salt.

It is an object of the present invention to provide an improved process for preparing ethylene/vinyl chloride copolymers. Another object of this invention is to provide convenient means for controlling polymerization of ethylene and vinyl chloride. Another object is to provide a process for preparing stable ethylene/vinyl chloride latexes with little or no coagulum.

These and other objects are accomplished in accordance with the present invention by the redox polymerization of ethylene and vinyl chloride in an aqueous emulsion system generally comprising the monomers, water, an oxidizing agent, a reducing agent, a versivalent metal compound (complexed if necessary so as to stay in solution), an alkaline buffer, an added electrolyte, an emulsifying agent, and a protective colloid which can be introduced before or after polymerization wherein reaction is controlled by injecting reducing agent as required to maintain the desired rate of polymerization.

We have discovered that ethylene/vinyl chloride latexes can be prepared by carrying out the polymerization of ethylene and vinyl chloride in an aqueous emulsion system. We have also discovered that non-crosslinked, excellent quality ethylene/vinyl chloride latexes are obtained if the alkaline polymerization of ethylene and vinyl chloride is conducted in the presence of a redox system containing a versivalent metal. We have discovered further that the polymerization reaction is best controlled and proceeds at the highest rate when reducing agent is added gradually or intermittently to the monomer charge. Further we discovered that ventable, stable latexes can be prepared by adding a protective colloid to the polymerization recipe. Other discoveries which we made are cited below in the detailed description of the invention.

The ethylene/vinyl chloride copolymers prepared by the processes of this invention have properties ranging from modified polyethylene to modified polyvinyl chloride. Copolymer compositions can contain from about 5 weight percent vinyl chloride up to about 90 weight percent vinyl chloride and include semicrystalline polymers, i.e., those with about 5 to 40 weight percent vinyl chloride; rubbery polymers, i.e., those with about 40 to 60 weight percent vinyl chloride; soft thermoplastics, i.e., those with about 60 to 75 weight percent vinyl chloride; and semi-rigid to rigid thermoplastics, i.e., those with about 75 to 95 weight percent vinyl chloride. Preferred ethylene/vinyl chloride compositions for use in most applications are the rubbery and soft thermoplastic polymers, i.e., those which contain from about 40 to 75 weight percent vinyl chloride.

Ethylene and vinyl chloride have different reactivity ratios with the result that vinyl chloride enters the copolymer faster than ethylene. In order to produce polymer having a preselected composition the monomer charge should contain ethylene in excess to that desired in the polymer composition.

Monomer and polymer compositions have been correlated below, i.e., the monomer mix ratios required to produce copolymers with various compositions are shown.

| Polymer | | | | Monomer mix | | | |
|---|---|---|---|---|---|---|---|
| Weight, percent | | Mole, percent | | Weight, percent | | Mole, percent | |
| VCl | $C_2H_4$ | VCl | $C_2H_4$ | VCl | $C_2H_4$ | VCl | $C_2H_4$ |
| 5 | 95 | 2.5 | 97.5 | 1.11 | 98.9 | 0.5 | 99.5 |
| 10 | 90 | 4.5 | 95.5 | 1.77 | 98.2 | 0.8 | 99.2 |
| 15 | 85 | 7.5 | 92.5 | 3.07 | 96.9 | 1.4 | 98.6 |
| 20 | 80 | 10.0 | 90.0 | 3.93 | 96.1 | 1.8 | 98.2 |
| 25 | 75 | 13.0 | 87.0 | 5.41 | 94.6 | 2.5 | 97.5 |
| 30 | 70 | 16.0 | 84.0 | 7.08 | 92.9 | 3.3 | 96.7 |
| 35 | 65 | 19.5 | 80.5 | 8.92 | 91.1 | 4.2 | 95.8 |
| 40 | 60 | 23.0 | 77.0 | 11.1 | 88.9 | 5.3 | 94.7 |
| 45 | 55 | 26.5 | 73.5 | 13.6 | 86.4 | 6.6 | 93.4 |
| 50 | 50 | 31.0 | 69.0 | 17.2 | 82.8 | 8.5 | 91.5 |
| 55 | 45 | 35.5 | 64.5 | 21.1 | 78.9 | 10.7 | 89.3 |
| 60 | 40 | 40.0 | 60.0 | 26.0 | 74.0 | 13.4 | 86.6 |
| 65 | 35 | 45.5 | 54.5 | 33.0 | 67.0 | 18.0 | 82.0 |
| 70 | 30 | 51.0 | 49.0 | 40.0 | 60.0 | 23.0 | 77.0 |
| 75 | 25 | 57.5 | 42.5 | 49.0 | 51.0 | 30.0 | 70.0 |
| 80 | 20 | 64.0 | 36.0 | 58.0 | 42.0 | 38.0 | 62.0 |
| 85 | 15 | 71.5 | 28.5 | 69.0 | 31.0 | 49.0 | 51.0 |
| 90 | 10 | 80.0 | 20.0 | 79.0 | 21.0 | 62.0 | 38.0 |
| 95 | 5 | 89.5 | 10.5 | 90.0 | 10.0 | 80.0 | 20.0 |

It is usually convenient to employ from about 0.1 to 10 parts (preferably 0.5 to 5 parts) by weight of water per part of total polymerizable monomers in the original clave charge. If desired, a portion of this water may be replaced by an organic solvent such as benzene, chlorobenzene, tertiary butyl methyl ether, etc.

"Redox" is used herein to denote reactions whereby oxidizing agents are reduced and reducing ageants are oxidized.

The much preferred oxidizing agents are the persulfates such as potassium peroxydisulfate, ammonium peroxydisulfate, and sodium peroxydisulfate. Other suitable oxidizing agents are the organic peroxides such as dibenzoyl peroxide, acetyl benzoyl peroxide, di-t-butyl peroxide, t-butyl peracetate, t-butyl peroxyisobutyrate, cumene hydroperoxide, etc.

The amount of oxidizing agent which may be used is generally about 0.01 to 10 parts by weight based on 100 parts of the monomers initially present and preferably about 0.1 to 5 parts thereof.

The preferred reducing agent is sodium formaldehyde sulfoxylate. Other reducing agents which can be employed include sodium sulfite, sodium thiosulfate, sodium bisulfite, sodium hydrosulfite, other alkali metal salts and ammonium salts of the aforementioned, reducing sugars, etc.

The oxidizing and reducing agents are used in substantially chemically equivalent amounts. The oxidizing agent is included in the original charge and the reducing agent added thereto gradually or intermittently throughout the polymerization. Where desired, the polymerization may be stopped before an equivalent amount of reducing agent is introduced. Also an excess of reducing agent can be added to the clave charge without adverse results. However, as a rule the weight of reducing agent employed, based on total monomers, is on about the same order as set forth above for the oxidizing agent.

Conveniently the reducing agent is added to the clave charge dissolved in water or some other suitable solvent so that better control can be exercised over the reaction. For example sodium formaldehyde sulfoxylate is usually introduced in the form of a 5 percent aqueous solution. Obviously other solutions of other strengths and other vehicles can be utilized.

It is most important that the polymerization be controlled by adding the reductant to the remainder of the redox recipe. The following advantages can result from this procedure:

(1) Very high polymerization rates (limited only by ability to remove the heat of reaction) at low temperatures can be realized.

(2) The polymerization reactor can be safely and conveniently brought to reaction temperature and pressure with essentially no polymerization occurring until the activator is injected.

(3) The polymerization can be started, slowed, or stopped at will by controlling the supply of activator, independent of temperature and pressure.

(4) Non-crosslinked (soluble) ethylene/vinyl chloride copolymers are readily prepared by this method.

(5) The rate of addition of reducing agent is a major controlling factor affecting molecular weight and affords means for preparing ethylene/vinyl chloride copolymers with pre-determined molecular weights.

There is a marked difference in reactivity depending on the order of addition of reagents. Thus, when the process of the present invention is reversed by adding oxidizing agent to the remainder of redox recipe, only about $\frac{1}{10}$ as much activity is observed and the polymerization rates are low. Also lower yields and products with lower molecular weights are recovered.

By "versivalent metal" is meant a metal capable of existing in two valence states. Examples are iron, copper, silver, and the like. Generally the metal is complexed with a sequestering agent to keep the metal ions in solution under the basic conditions employed. For example iron (III) is usually complexed with ethylenediaminetetraacetic acid tetrasodium salt.

About 0.0001 to 0.1 part by weight of versivalent metal should be employed per 100 parts of combined monomers initially present and preferably from about 0.001 to 0.01 part.

By including the versivalent metal in the redox recipe faster rates and higher yields are obtained than with the conventional recipe. Although it is greatly preferred to use is versivalent metal in the polymerization charge, the metal ions may be omitted with certain redox systems.

As the alkaline buffer, any water-soluble compound which gives a pH above 7 to about 12 may be used. Preferably the reaction solution is buffered to a pH having a value from about 8-11. Examples of buffers which may be so employed include borax, sodium carbonate, sodium acetate, disodium phosphate, sodium citrate, sodium benzoate, sodium tartrate, sodium bicarbonate, ammonium hydroxide, and the like.

It is desirable that a fairly constant pH be maintained, i.e., the pH should be controlled within about 3 units during the polymerization reaction.

The amount of buffer included in the charge generally comes to about 0.01 to 10 parts and preferably to about 0.1 to 1.0 parts based on 100 parts of monomers initially present.

It is often advantageous to include an added electrolyte in the polymerization charge. This tends to help avoid coagulation and prevent gel formation. Sodium pyrophosphate is most effective for this purpose, however any other neutral or alkaline inorganic salt can be used.

The added electrolyte, when employed is used in from about 0.01 to 10 parts by weight based on 100 parts of combined monomers initially present; the preferred range is from about 0.1 to 10 parts by weight.

An emulsifier system is essential in the presently disclosed processes. The emulsion polymerizations herein employed have the advantage over the reported aqueous phase polymerizations of ethylene and vinyl chloride in that homogeneous latexes of excellent quality are produced.

The emulsifying agent may be ionic or non-ionic and should be base stable. Preferred emulsifiers are the anionic or non-ionic type. Suitable emulsifiers include the following: ethylene oxide alkyl phenol condensation products, polyoxyethylated vegetable oils, polyoxyethylene fatty alcohol ethers, polyglycol fatty acid esters, polyoxypropylene modified fatty acid esters, ammonium alkyl phenoxypolyoxyethylene ethyl sulfates, long chain alkyl aryl sulfonates, sodium higher alkyl sulfates, sodium alkyl naphthalene sulfonates, higher alkyl polyoxyethylene amines, etc.

The emulsifier should be used in about 0.1 to 20 parts by weight based on 100 parts of combined monomers as initially charged. Preferably the emulsifier is included to extent of about 1.0 to 10 parts by weight per 100 parts of combined monomers initially present.

Polymer molecular weight and the polymerization rates appear to increase with increasing emulsifier concentration. Emulsifier composition probably also significantly affects polymer molecular weight. It has also been observed that increasing the emulsifier level reduces the latex viscosity.

Where the ethylene/vinyl chloride copolymer is to be used as a resin, i.e., a latex is not desired, an emulsifier system utilizing one or more of the aforementioned emulsifying agents is satisfactory. However where the latex is desired, gross coagulation of the polymer is a severe problem. This coagulate is believed to form in the letdown valve when venting the clave. Generally 50-100 percent coagulation occurs unless the clave is vented with extreme care.

We have found that a combination of an emulsifying agent and a protective colloid form an effective emulsifier system for the emulsion polymerization of ethylene/vinyl chloride without coagulation of the polymer latex. Recipes containing both emulsifier and protective colloid give latexes sufficiently stable to permit venting of the clave with little or no coagulant being formed.

The protective colloids used for this purpose are generally high molecular weight non-ionic detergents which are colloidal in nature. Polyvinyl alcohol (which is prepared by hydrolyzing polyvinyl acetate) is much preferred. This is available in several molecular weights and degrees of hydrolysis. Other water soluble colloids which are effective are methoxycellulose, hydroxyethylcellulose, algin derivatives, salts of protalbinic and lysalbinic acid, etc.

The mode of introducing the protective colloid appears very important, i.e., before, during, or after the polymerization. The post-addition method of stabilizing gives vastly improved latexes over those containing protective colloid in the original charge, particularly in the elimination of grain.

The amount of protective colloid used, whether pre- or post-added or both, should be on the order of .01 to 10 parts by weight and preferably about 0.05 to 5 parts by weight based on combined monomers as originally charged.

Recovery of the product in the form of latex makes possible its use for many applications not otherwise practicable, e.g., paper chemicals, surface coatings, rug backing, etc.

The polymerization temperatures used in this invention are within the range from about 0° to 75° centigrade. The preferred range for our processes is from about 20° to 40° centigrade with the operating temperature usually being 30° centigrade.

The pressure employed is superatmospheric and generally exceeds 1,000 p.s.i. and is preferably in the range from 5,000–15,000 p.s.i., however, pressures as high as 50,000 p.s.i. or even higher may be employed. The pressure is maintained within the desired range either by injecting water, ethylene, vinyl chloride of a mixture of ethylene and vinyl chloride.

Examples

To a 1-liter autoclave were charged oxidizing agent, metal ion, emulsifying agent, buffer, and water according to the schedule in Table 1. Temperature was adjusted and ethylene and vinyl chloride pressured in. (See column 2.) Reducing agent was injected to start the reaction and added as needed to maintain rate. In runs 3 and 5 the latexes so formed were post-stabilized with polyvinyl alcohol. In runs 4 and 6 polyvinyl alcohol was added to the original clave charge. Runs 1 and 2 are included for comparative purposes.

TABLE 1.—"POLYMERIZATION DATA: RUNS 1–6"

| Run | 1 | 2 | 3 | 4 | 5 | 6 |
|---|---|---|---|---|---|---|
| Clave charge: | | | | | | |
| (NH$_4$)$_2$S$_2$O$_8$, g | | | 3 | | 3 | |
| K$_2$S$_2$O$_8$, g | 3 | 3 | | 1 | | 3 |
| Fe$^{III}$, mg | 28 | 28 | 14 | 14 | 14 | 28 |
| Na$_2$CO$_3$, g | 3 | 3 | 3 | 3 | 3 | 3 |
| D-94,[1] g | 15 | | | | | 15 |
| T-94,[1] g | | 7 | | | | |
| Santomerse ME,[1] g | | | 20 | 30 | 15 | |
| Sterox, DJ,[1] g | | 7 | | | | |
| Elvanol 51-05,[1] g | | | | 2 | | 2 |
| Airco 125,[1] g | | | | | | |
| H$_2$O, g | 400 | 400 | 400 | 400 | 400 | 400 |
| Ethylene, g | 256 | 298 | 235 | 250 | 235 | 250 |
| VCl, g | 216 | 149 | 228 | 240 | 228 | 240 |
| Reaction conditions: | | | | | | |
| Temp., °C | 32 | 30 | 30 | 30 | 30 | 30 |
| Pressure, k.p.s.i. | 19.5 | 14.7 | 15 | 15 | 15 | 15 |
| Time, min | 90 | 40 | 62 | 45 | 30 | 100 |
| Added during reaction: | | | | | | |
| SfS, g. (as 5% soln.) | 0.43 | 2.44 | 1.41 | 0.74 | 2.60 | 0.27 |
| VCl, g | 140 | 130 | 110 | 100 | 120 | 120 |
| Post added: | | | | | | |
| Elvanol 51-05,[1] g | | | 2 | | 3 | |
| Santomerse ME,[1] g | | | 10 | | 15 | |

See footnotes end of Table 4.

Ethylene/vinyl chloride latexes were recovered on venting the reactor. Evaluation data on these is given in Table 2.

In runs 3 and 5 (polyvinyl alcohol, post-added prior to venting) only a very small amount of coagulant was formed. Run 4 (polyvinyl alcohol, added prior to polymerization) likewise produced almost no coagulant, however the quality of the latex was poor compared to the latexes obtained in runs 3 and 5. The product from run 6 was easily vented to give a latex of fair quality though more coagulate was formed than when the stabilizer was post-added. The products from runs 1 and 2 (no polyvinyl alcohol introduced) had large amounts of coagulant despite careful venting, and had inferior quality.

TABLE 2.—"EVALUATION DATA: RUNS 1–6"

| Run | 1 | 2 | 3 | 4 | 5 | 6 |
|---|---|---|---|---|---|---|
| Yield of latex, g | 641 | 257 | 814 | 755 | 747 | 703 |
| pH (latex) | 9.5 | 9.6 | 8.4 | 9.1 | 8.4 | |
| Poly. solids, percent | 47 | 50 | 43 | 46 | 41 | 43 |
| Poly. sp. gravity | 1.2177 | 1.2306 | 1.2066 | 1.2366 | 1.2110 | 1.1870 |
| Percent VCl | 72 | 78 | 72 | 76 | 72 | 69 |
| Yield of coag., g | 53 | 240 | <1 | <1 | 2 | 20 |
| Tensile prop.: | | | | | | |
| Strength failure, p.s.i. | | 3357 | 1605 | 1892 | | 3423 |
| Elong. failure, percent | | 587 | 808 | 553 | | 600 |
| Clash Berg:[2] | | | | | | |
| T$_f$, °C | −9 | +1 | −8 | +2 | | −½ |
| T$_{2000}$, °C | +10 | +14½ | +5 | +14½ | | +12½ |
| S.R., °C | 19 | 13½ | 13 | 12½ | | 13 |
| 25° C., Mod; p.s.i. | <2,000 | <2,000 | <2,000 | <2,000 | | <2,000 |

See footnote end of Table 4.

TABLE 3.—"POLYMERIZATION DATA: RUNS 7–12"

| Run | 7 | 8 | 9 | 90 | 11 | 12 |
|---|---|---|---|---|---|---|
| Clave charge: | | | | | | |
| (NH$_4$)$_2$S$_2$O$_8$, g | 1.14 | 1.14 | 2.5 | 2.5 | 1.14 | 1.14 |
| Fe$^{III}$, mg | 11 | 11 | 14 | 14 | 11 | 11 |
| Na$_2$CO$_3$, g | | | 1.2 | 1.2 | | |
| NH$_4$OH, g. 28% soln | 1.8 | 1.8 | 1.8 | 1.8 | 1.8 | 1.8 |
| Na$_4$P$_2$O$_7$.10H$_2$O, g | 8.92 | 8.92 | 1.0 | 1.0 | 8.92 | 4.46 |
| D-94,[1] g | 20 | 20 | 18 | 18 | 20 | 20 |
| H$_2$O, g | 400 | 400 | 400 | 400 | 400 | 400 |
| Ethylene, g | 235 | 250 | 205 | 318 | 235 | 235 |
| VCl, g | 228 | 240 | 285 | 112 | 228 | 228 |
| Reaction conditions: | | | | | | |
| Temp., °C | 30 | 30 | 30 | 30 | 30 | 30 |
| Pressure, k.p.s.i. | 15 | 15 | 10 | 15 | 15 | 15 |
| Time, min | 169 | 147 | 155 | 250 | 138 | 177 |
| Added during reaction: | | | | | | |
| SFS, g. (as 5% soln.) | 0.36 | 0.36 | 0.42 | 0.87 | 0.33 | 0.31 |
| VCl, g | 140 | 145 | 145 | 159 | 131 | 140 |
| Post added: | | | | | | |
| Elvanol 70-05,[1] g | 30 | | | | 2 | |
| Elvanol 50-42,[1] g | | | | | | 2 |
| Water, g | 75 | | | | 50 | 50 |

See footnotes end of Table 4.

Table 3 contains additional examples of polymerization processes for preparing ethylene/vinyl chloride latexes. The procedure is identical to the procedure employed for runs 1–6 except that an electrolyte is included in the clave charge.

In runs 7, 11 and 12 polyvinyl alcohol was post-added as a stabilizer; runs 8, 9, 10 provide standards for comparison.

The clave was vented from the bottom so that the latexes could be recovered without coagulate being formed. The latexes thus obtained were tested for sheer stability by conventional "hand-rub" tests. The latexes prepared in runs 7, 11 and 12 were stable past the end point of the test. This is in marked contrast to the latexes from runs 8, 9 and 10 which broke in 15 sec. or less.

copolymers which comprises polymerizing ethylene and vinyl chloride in aqueous emulsion at superatmospheric pressure and temperature of 0° C. to 75° C. in the presence of a persulfate oxidizing agent, a reducing agent selected from the group consisting of ammonium and alkali metal sulfites, thiosulfates, bisulfites, hydrosulfites, and formaldehyde sulfoxylates, a versivalent metal convertible between different positive valence states by oxidation and reduction reactions, and a emulsifying agent wherein the polymerization reaction is controlled by adding the reducing agent to the remaining components of the polymerization charge both to initiate polymerization and also subsequently during the polymerization as required to maintain the desired rate of polymerization and obtain high conversion of monomers to polymer and wherein the

TABLE 4.—"EVALUATION DATA: RUNS 7-12"

| Run | 7 | 8 | 9 | 10 | 11 | 12 |
|---|---|---|---|---|---|---|
| Yield of latex, g | 824 | 757 | 804 | 705 | 740 | 750 |
| Latex viscosity, poise | 28 | 35 | 250 | 47 | 25 | 25 |
| Part. size, A | 1,880 | 1,099 | 1,010 | 1,200 | 1,830 | 2,160 |
| Poly. solids, percent | 46 | 50 | 53 | 48 | 48 | 43 |
| Percent VCl | 71 | 77 | 78 | 54 | 72 | 71 |
| Latex Stab., sec | 30 | 8 | 15 | 6 | 30 | 30 |
| Tensile prop.: | | | | | | |
| Strength failure, p.s.i | 2,132 | 3,418 | 3,003 | | 2,224 | 2,637 |
| Elong. failure, percent | 700 | 520 | 392 | | 758 | 658 |
| Clash Berg: [2] | | | | | | |
| $T_f$, °C | −10 | +4½ | | | −8½ | −9½ |
| $T_{2,000}$, °C | +7 | +17 | | | +6 | +9½ |
| S.R., °C | 17 | 12½ | | | 14½ | 19 |
| 25° C. Mod., p.s.i | <2,000 | <2,000 | | | <2,000 | <2,000 |

[1] Trademark or brand name: D-94=sodium dodecylbenzene sulfonate; T-94=sodium tridecylbenzene sulfonate; Santomerse ME=NaOH neutralized sulfonate from a mixture of long and short chain alkyl benzenes; Sterox DJ=dodecyl phenyl-ethylene oxide condensate; Elvanol 51-05=low viscosity polyvinyl alcohol, 88% hydrolyzed polyvinyl acetate; Airco 125=medium viscosity polyvinyl alcohol, superhydrolyzed polyvinyl acetate; Elvanol 70-05=low viscosity polyvinyl alcohol, 99% hydrolyzed polyvinyl acetate; Elvanol 50-42=high viscosity polyvinyl alcohol, 88% hydrolyzed polyvinyl acetate.

[2] The Clash Berg modulus gives information of the torsional stiffness of the polymer as related to temperature. The $T_f$ value is the temperature at which the polymer just begins to have some slight degree of flexibility. The $T_{2,000}$ value is the temperature at which the material becomes very rubbery and non-load bearing. The Stifflex range ($T_f$–$T_{2,000}$) represents the temperature range over which the polymer is reasonably tough, i.e., high in impact strength, and at the same time rigid enough to bear some load. The value of the 25° C. modulus is determined to provide indication of the torsional modulus at approximately room temperature.

What is claimed is:

1. In a process for preparing ethylene/vinyl chloride copolymers which comprises the redox polymerization of ethylene and vinyl chloride in an aqueous emulsion system at a pH of 7 to 12 and at superatmospheric pressures up to 50,000 p.s.i. employing a persulfate oxidizing agent and a reducing agent selected from the group consisting of ammonium and alkali metal sulfites, thiosulfates, bisulfites, hydrosulfites, and formaldehyde sulfoxylates, and versivalent metal convertible between different positive valence states by oxidation and reduction reactions, the steps (1) controlling the polymerization reaction by adding the reducing agent to the remaining components of the polymerization charge both to initiate polymerization and also subsequently during the polymerization as required to maintain the desired rate of polymerization and obtain high conversion of monomers to polymer and (2) adding about 0.1 to 20 parts by weight of emulsifier and 0.01 to 10 parts by weight of protective colloid per 100 parts of combined monomers initially present.

2. The process of claim 1 where sodium formaldehyde sulfoxylate is added to a polymerization charge comprising iron as a versivalent metal and the temperature is in the range of 0° C. to 75° C.

3. In a process for preparing ethylene/vinyl chloride copolymers which comprises the redox polymerization of ethylene and vinyl chloride in an aqueous emulsion system under superatmospheric pressure to form an ethylene/vinyl chloride latex, the step which comprises stabilizing the ethylene/vinyl chloride latex with a high molecular weight, non-ionic polymeric protective colloid subsequent to polymerization but prior to venting the reactor.

4. The process of claim 3 where the protective colloid is polyvinyl alcohol.

5. A process for preparing ethylene/vinyl chloride copolymers which comprises polymerizing ethylene and vinyl chloride in aqueous emulsion at superatmospheric pressure and temperature of 0° C. to 75° C. in the presence of a persulfate oxidizing agent, a reducing agent selected from the group consisting of ammonium and alkali metal sulfites, thiosulfates, bisulfites, hydrosulfites, and formaldehyde sulfoxylates, a versivalent metal convertible between different positive valence states by oxidation and reduction reactions, and a emulsifying agent wherein the polymerization reaction is controlled by adding the reducing agent to the remaining components of the polymerization charge both to initiate polymerization and also subsequently during the polymerization as required to maintain the desired rate of polymerization and obtain high conversion of monomers to polymer and wherein the ethylene/vinyl chloride latex so produced is stabilized with a high molecular weight, non-ionic polymeric protective colloid subsequent to polymerization but prior to venting the reactor.

6. The process of claim 5 where the polymerization reaction is carried out at a pH within the range between 8 and 11.

7. The process of claim 5 where from about 0.1 to 10 parts by weight of water is used per part of total monomers initially present.

8. The process of claim 5 where copolymer compositions which contain from about 5 weight percent vinyl chloride up to about 90 weight vinyl chloride are prepared.

9. The process of claim 1 where the oxidizing agent and the reducing agent are each present in about 0.01 to 10 parts by weight based on 100 parts of combined monomers initially present.

10. The process of claim 1 where the pressure employed falls within the range from about 1,000–50,000 p.s.i.

11. The process of claim 1 where about 0.0001 to 0.1 part by weight of versivalent metal is employed per 100 parts of combined monomers initially present.

12. The process of claim 1 where the pressure employed falls within the range from about 5,000–15,000 p.s.i. and where the reaction is carried out at a temperature from about 20° to 40° centigrade and at a pH within the range between 8 and 11.

13. The process of claim 1 where the oxidizing agent and the reducing agent are each present in about 0.1 to 5 parts by weight based on 100 parts of combined monomers initially present.

14. The process of claim 1 where about 0.001 to 0.01 part by weight of versivalent metal is employed per 100 parts of combined monomers initially present.

15. The process of claim 1 where copolymers compositions which contain from about 40 weight percent vinyl chloride up to about 75 weight percent vinyl chloride are prepared.

16. The process of claim 12 in which iron is the versivalent metal.

17. The process of claim 1 in which the reducing agent is added gradually throughout the polymerization.

18. The process of claim 1 in which the reducing agent is added intermittently throughout the polymerization.

References Cited

UNITED STATES PATENTS

| 3,255,164 | 6/1966 | Visger et al. | 260—87.7 |
| 2,227,163 | 12/1940 | Starck et al. | 260—32 |
| 2,368,949 | 2/1945 | Smith | 260—89.1 |
| 2,422,392 | 6/1947 | Brubaker et al. | 260—87.5 |
| 2,497,291 | 2/1950 | Brubaker et al. | 260—87.5 |

JOSEPH L. SCHOFER, *Primary Examiner.*

J. A. DONAHUE, *Assistant Examiner.*